(12) United States Patent
Tian (10) Patent No.: US 11,186,030 B2
(45) Date of Patent: Nov. 30, 2021

(54) THIN-WALLED MICROPLATE AND THERMOFORMING METHOD

(71) Applicant: VitroDx, Inc., Fremont, CA (US)

(72) Inventor: Yunqi Tian, Fremont, CA (US)

(73) Assignee: VitroDx, Inc., Fremont, CA (US)

( * ) Notice: Subject to any disclaimer, the term of this patent is extended or adjusted under 35 U.S.C. 154(b) by 510 days.

(21) Appl. No.: 15/568,745

(22) PCT Filed: Apr. 22, 2016

(86) PCT No.: PCT/US2016/028929
§ 371 (c)(1),
(2) Date: Oct. 23, 2017

(87) PCT Pub. No.: WO2016/172540
PCT Pub. Date: Oct. 27, 2016

(65) Prior Publication Data
US 2018/0141263 A1 May 24, 2018

Related U.S. Application Data

(60) Provisional application No. 62/152,554, filed on Apr. 24, 2015.

(51) Int. Cl.
*B01L 3/00* (2006.01)
*B29C 51/10* (2006.01)
*B29C 33/00* (2006.01)
*B29C 51/08* (2006.01)
*B29C 51/42* (2006.01)
(Continued)

(52) U.S. Cl.
CPC ............ *B29C 51/10* (2013.01); *B01L 3/5085* (2013.01); *B29C 33/0022* (2013.01); *B29C 51/082* (2013.01); *B29C 51/36* (2013.01); *B29C 51/42* (2013.01); *B29C 51/421* (2013.01); *B29C 51/428* (2013.01); *B01L 2200/12* (2013.01); *B29C 51/04* (2013.01); *B29C 2791/006* (2013.01); *B29K 2101/12* (2013.01);
(Continued)

(58) Field of Classification Search
CPC .......... B01L 3/5085; B01L 2300/0829; B01L 2300/0893; B01L 2200/12; B29C 51/082; B29C 33/0022
USPC ......................................... 422/554, 553, 552
See application file for complete search history.

(56) References Cited

U.S. PATENT DOCUMENTS 4,050,873 A 9/1977 Brumlik
4,128,369 A 12/1978 Kemerer
(Continued)

FOREIGN PATENT DOCUMENTS

CA 1124977 A 6/1982

OTHER PUBLICATIONS

International Preliminary report on Patentability dated Nov. 2, 2017, for PCT Application No. PCT/US2016/28929, filed on Apr. 22, 2016, 13 pages.
(Continued)

*Primary Examiner* — Natalia Levkovich
(74) *Attorney, Agent, or Firm* — Morrison & Foerster LLP (57) ABSTRACT

Described herein are microplates having wells with ultra-thin walls and methods of forming thereof. The microplates can be made by thermoforming processes that use ultrasound, electricity, etc., to heat a thin polymer sheet or film prior to molding. Vacuum can be optionally applied to help form or shape the wells.

14 Claims, 7 Drawing Sheets

(51) Int. Cl.
   *B29C 51/36*   (2006.01)
   *B29L 31/00*   (2006.01)
   *B29C 51/04*   (2006.01)
   *B29K 101/12*  (2006.01)
   *B29K 105/00*  (2006.01)

(52) U.S. Cl.
   CPC ... *B29K 2105/256* (2013.01); *B29L 2031/753* (2013.01); *B29L 2031/756* (2013.01)

(56) References Cited

U.S. PATENT DOCUMENTS

| | | | |
|---|---|---|---|
| 5,447,679 A * | 9/1995 | Eigen | B29C 51/10 264/544 |
| 5,738,816 A * | 4/1998 | Tidemann | H05K 13/0084 264/553 |
| 2003/0108710 A1 | 6/2003 | Coyle | |
| 2004/0191896 A1 | 9/2004 | Miao | |
| 2004/0214315 A1 | 10/2004 | Saluz | |
| 2009/0194913 A1 | 8/2009 | Chang | |
| 2011/0215501 A1 | 9/2011 | Elyasi | |
| 2014/0061972 A1 | 3/2014 | Motadel | |

OTHER PUBLICATIONS

International Search Report and Written Opinion dated Aug. 5, 2016, for PCT Application No. PCT/US2016/28929, filed on Apr. 22, 2016, 23 pages.

Kreusch, S et al. (Feb. 2003). "UV Measurements in Microplates Suitable For High-Throughput Protein Determination," 313(2):208-215, retrieved from the Internet on Jun. 27, 2016. URL http://www.ncbi.nlm.nih.gov/pubmed/12605857, last visited Jun. 27, 2016, 4 pages.

Wikipedia. "Ultrasonic Welding," Jan. 3, 2015. Retrieved from the Internet on Jun. 28, 2016. URL https://web.archive.org/web/20150103190651/https://en.wikipedia.org/wiki/Ultrasonic welding, last visited Jun. 28, 2016, 7 pages.

* cited by examiner

THIN-WALLED MICROPLATE AND THERMOFORMING METHOD

CROSS REFERENCE TO RELATED APPLICATIONS

This application is a National Phase filing under 35 U.S.C. § 371 of International Application No.: PCT/US2016/28929, filed on Apr. 22, 2016, which claims priority benefit to U.S. Provisional Application Ser. No. 62/152,554 filed on Apr. 24, 2015, the contents which are hereby incorporated by reference in their entirety.

FIELD

The present application relates to microplates having thin-walled wells. The microplates can be made by thermoforming processes that use ultrasound, electricity, etc., to heat a thin polymer sheet or film prior to molding. Vacuum can be optionally applied to help form or shape the wells.

BACKGROUND

Microplates (multi-well plates) are frequently used for cell culture, qualitative and quantitative assays, storage, and substance transfer in various biological research protocols and diagnostic procedures. For example, thin-walled microplates are currently used in processes where quick thermal transfer is required and/or when low background fluorescence and/or luminescence is desired. The microplates are generally injection molded to form plates having footprints that conform to industry standards, e.g., 6×8 wells, 8×12 wells, 16×24 wells, and 32×48 wells. This standardization is useful when the microplates are employed in automated or robotic processes.

To provide assay consistency, the CV (coefficient of variation) value between lots of microplates and wells within the plates should be low. Other desirable microplate features include the capability of reading protein and DNA/RNA concentrations with light having a low frequency, and flatness of well arrays, especially when the process involves robotic handling of the microplate. However, conventional injection molding techniques are unable to provide some of the aforementioned features. This may be due, in part, to the injection mold requiring a runner gate (such as hot runner or cold runner) that allows molten plastic to be injected into the cavity of the mold. The thickness of the material at this point (the injection gate point), which is typically at the bottom of each well, may be thicker than the side walls of the well. The non-uniform wall thickness can lead to uneven heating of the sample contained in the well and thus, increased variability in reaction conditions.

Accordingly, having thin-walled microplates with high structural uniformity and methods of forming such microplates would be useful. It would also be useful to have low cost methods suitable for the large scale manufacture of microplates with thin-walled wells.

SUMMARY

Described herein are thin-walled microplates and methods of forming thereof. The thin-walled microplates may be useful in processes that require precise temperatures and/or rapid changes in temperature, e.g., polymerase chain reaction (PCR). The microplates may include a rigid frame or skirt that helps provide dimensional stability to the microplate so that it may be reliably handled, either manually or by automated or robotic processes. Dimensional stability may also help to provide reliable movement and positioning of the microplate as well as accurate movement of samples and reagents into and out of individual wells when employed in automated or robotic processes.

In general, the methods for manufacturing a thin-walled well comprise advancing a polymer film having a film thickness into an embossing device, the embossing device comprising an upper mold and a lower mold; heating the polymer film; and applying a force to the polymer film by pressing the upper and/or lower molds of the embossing device.

The polymer film may be heated using a heated upper mold and/or heated lower mold of the embossing device. Heating may be to a temperature ranging from about 80 to about 280 degrees Celsius. Electric or ultrasonic heat sources may be employed to heat the upper and/or lower molds, as well as sources that use convection for heat transfer. When an ultrasonic heat source is used, it may produce heat by vibrating at a frequency ranging from about 15 KHz to 40 KHz. In some instances, the polymer film may further be heated prior to advancement into the embossing device. The polymer film may be an extruded polymer film having a film thickness ranging from about 50 microns to about 1000 microns.

The thin-walled wells that are formed may have a wall thickness ranging between about 20 to about 120 microns or about 20 microns to about 80 microns. In some instances, the thin-walled well has a wall thickness of about 50 microns. The thin-walled wells may also be formed to have any suitable shape, e.g., a conical shape, a square shape, a V-shape, or a rectangular shape.

The amount of force that may be applied to the polymer film may range from about 3.0 to about 6.0 kg. A vacuum force may also be applied to the polymer film while the upper and lower molds of the embossing device are pressed together. The vacuum force may range from about 0.3-0.5 MPa.

After the thin-walled wells are formed, they are typically separated from the polymer film using a cutting die. The polymer film may comprise a thermoplastic polymer. The thermoplastic polymer may comprise a polymer from the class of styrenics, copolyesters, polyurethanes, polyamides, polyolefin blends, polyolefin alloys, or a combination thereof. Exemplary thermoplastic polymers include without limitation, acrylonitrile butadiene styrene (ABS), polycarbonate, a polyester, polyethylene, polyethylene terephthalate, polylactic acid, poly(methylmethacrylate), a polyolefin, polyphenylene oxide, polypropylene, polystyrene, polytetrafluoroethylene, polyvinyl chloride, and copolymers, mixtures, and blends thereof.

The methods described herein may form a single thin-walled well, or an array of wells, e.g., arrays that include 48, 96, 384, or 1536 thin-walled wells. A plurality of wells configured as a strip of wells may also be formed. The plurality of thin-walled wells may have a CV value ranging from about 3% to about 5%. In one variation, the plurality of thin-walled wells has a CV value of about 3%. In another variation, the plurality of thin-walled wells has a CV value of about 4%. In other variations, the plurality of thin-walled wells has a CV value of about 5%.

Further described herein are microplates including a well portion, the well portion comprising a plurality of thin-walled wells having a wall thickness, wherein the plurality of wells lack an injection gate point. As previously stated, the wall thickness of the plurality of thin-walled wells may be between about 20 and about 120 microns or between about 20 and about 80 microns. In some instances, the wall thickness of the plurality of thin-walled wells is about 50 microns. Here the plurality of thin-walled wells may have a CV value ranging from about 3% to about 5%. In some variations, the microplate further comprises a frame attached to the well portion. The microplates may be made by any one of the methods described herein.

Batches of microplates are also described herein. A batch of microplates may comprise at least two microplates, the batch including a plurality of thin-walled wells lacking an injection gate point and having a well CV value, wherein the well CV value ranges from about 3% to about 5%. In some instances the well CV value is about 3%. In other instances, the well CV value is about 4%. In yet further instances, the well CV value is about 5%. Wall thickness of the plurality of thin-walled wells may range from about 20 to about 120 microns or from about 20 to about 80 microns. For example, the plurality of thin-walled wells may have a wall thickness of about 50 microns. In addition, the plurality of thin-walled wells may have a conical shape, a square shape, a V-shape, or a rectangular shape.

Systems for manufacturing thin-walled wells are further described herein. In general, the systems include a feed mechanism for advancing a polymer film; a mold heater; and an embossing device comprising an upper mold and a lower mold coupled to the mold heater. The mold heater may be any suitable heater, e.g., an electric heater, ultrasonic heater, convection heater, etc. In one variation, the mold heater is an ultrasonic heater. It may be beneficial to include a vacuum pump in the system coupled to the embossing device to help form the thin-walled wells. The systems may further include a die cutter disposed downsteam from the embossing device and a user interface configured to control one or more parameters of the system.

DETAILED DESCRIPTION

The microplates described herein comprise thin-walled wells useful for decreasing the resistance to heat transfer to samples within the wells. The microplates are generally made by thermoforming, and thus, the starting material can be a very thin polymer sheet or film. Embossing wells into the polymer film can further reduce the thickness of the polymer in the well area and form wells that lack an injection gate point. The wells typically include uniformly thin walls, but in some instances, the thickness of the well bottom may be formed to be thinner than the wall at the top of the well. A skirt or frame may also be adhered to the microplate to impart structural rigidity to the microplate. As previously stated, the microplate may be used in various processes, e.g., PCR, cell culture, immunoassays, reagent sample storage, chemical component storage, etc.

Microplates

The microplates disclosed herein may have ANSI/SLAS standard footprints including, e.g., 48, 96, 384, or 1536 wells. However, any desired number of wells can be provided. In some instances, the wells are not provided in an array, but instead are produced as a single (individual) well, or two or more wells joined to each other by connecting segments. Strips with a single row of wells ("strip tubes") can also be provided.

Figure 1A:
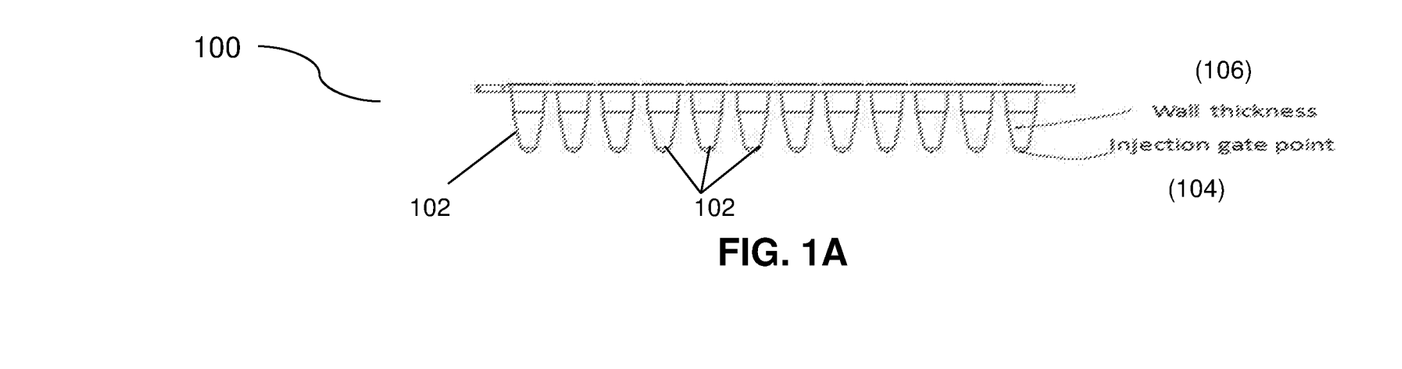
FIG. 1A shows a side, cross-sectional view of microplate wells formed by injection molding that include an injection gate point.
Figure 1B:
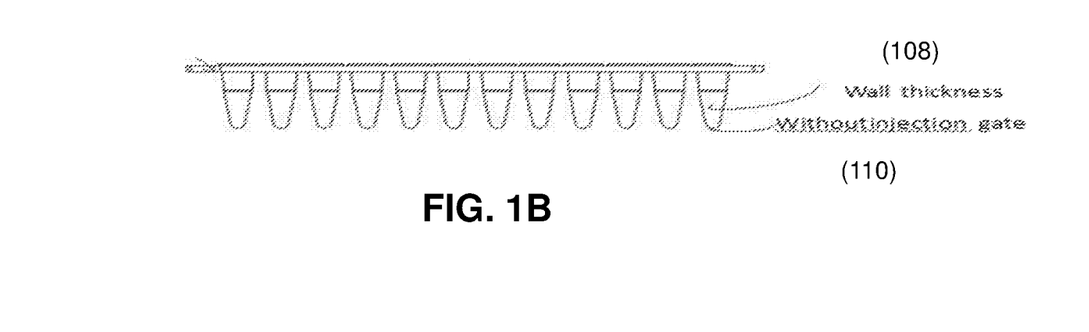
FIG. 1B depicts a side, cross-sectional view of microplate wells that lack an injection gate point.

The wells can be variously shaped. For example, the wells can have a conical, square, rectangular, v-shape, or other suitable shape. Well shape can also be customized as desired. In all instances, however, the wells will not include an injection gate point. FIG. 1A shows a microplate (100) comprising a plurality of wells (102) formed by an injection molding process. At the bottom of the wells is an injection gate point (104) having a wall thickness greater than the side wall thickness (106) of the well. In comparison, wells formed by the thermoforming processes described herein generally have a uniform wall thickness throughout, as illustrated in FIG. 1B (side wall thickness (108) is the same as wall thickness at the bottom of the wells (110)).

The microplate wells generally have a substantially decreased wall thickness. Wall thickness may range from about 20 to about 120 microns or from about 20 microns to about 80 microns. For example, wall thickness of the wells may be about 20 microns, about 25 microns, about 30 microns, about 35 microns, about 40 microns, about 45 microns, about 50 microns, about 55 microns, about 60 microns, about 65 microns, about 70 microns, about 75 microns, about 80 microns, about 85 microns, about 90 microns, about 95 microns, about 100 microns, about 105 microns, about 110 microns, about 115 microns, or about 120 microns. In one variation, the microplates well(s) have a wall thickness of about 50 microns.

The volume of the microplate wells may range from about 1.0 to about 300 microliters, about 1.0 to about 250 microliters, about 1.0 to about 200 microliters, about 1.0 to about 150 microliters, about 1.0 to about 100 microliters, about 1.0 to about 50 microliters, about 1.0 to about 25 microliters, about 1.0 to about 20 microliters, about 1.0 to about 15 microliters, about 1.0 to about 10 microliters, or about 1.0 to about 5 microliters.

The microplates may be made from any suitable thermoplastic polymer. The thermoplastic polymer may be a homopolymer, copolymer, or mixtures or blends of three or more polymers. The thermoplastic polymer may comprise a polymer from the class of styrenics, copolyesters, polyurethanes, polyamides, polyolefin blends, polyolefin alloys, or a combination thereof. Exemplary thermoplastic polymers include without limitation, acrylonitrile butadiene styrene (ABS), polycarbonate, polyesters, polyethylene, polyethylene terephthalate, polylactic acid, poly(methylmethacrylate), polyolefins, polyphenylene oxide, polypropylene, polystyrene, polytetrafluoroethylene, polyvinyl chloride, and copolymers, mixtures, and blends thereof.

The microplates described herein may be formed so that the shape/geometry of each well is substantially the same and/or the batch to batch variation less between microplates. Variation between wells within a plate or among different batches of plates may be minimized (i.e., wall thickness between wells of the same microplate and wells of different batches of microplates exhibit high homogeneity). For example, the CV value between wells of the same microplate and between batches of microplates may range from about 3% to about 5%. In one variation, the CV value is about 3%. In another variation, the CV value is about 4%. In yet a further variation, the CV value is about 5%.

Additionally, the microplates may comprise high flatness, which can be measured using e.g., laser or other known light-based methods. The microplates may be transparent or variously colored, e.g., white or black. In some variations, a bar code is provided on the microplate to identify each microplate or so that sample information can be edited by the end-user.

In another variation, the thin-welled microplate comprises two components, a well portion having a plurality of wells and a frame or frame portion, which are joined to form a unitary microplate. The frame portion may impart structural rigidity to the microplate that may help with its handling. The frame may be made from the same material used to make the wells or a different material. The frame portion may be joined to the well portion by any suitable method. For example, ultrasonic welding or thermal welding can be employed to furnish a unitary microplate.

Manufacturing Methods

Methods for manufacturing the microplates and thin-walled wells are also described herein. In general, the microplates are made by a thermo-embossing process where an extruded polymer substrate (e.g., a polymer sheet, film, or layer) is first heated to soften the polymer, and then embossed to form any suitable number of wells in the substrate, e.g., one well or multiple wells can be formed, as stated above. The pre-formed, extruded polymer substrate generally has a uniform thickness that helps to ensure that the embossed wells have a consistent wall thickness (e.g., as previously stated the CV value can be between about 3% to about 5%, however in some instances, it can be about 3% or less). The wells that are formed by this process lack an injection gate point, which further helps maintain a consistent wall thickness. Heating of the polymer can be accomplished by any suitable heating unit. However, it may be useful for the heat to be generated using an ultrasonic heating unit.

In some variations, the method for manufacturing a thin-walled well includes advancing a polymer film having a film thickness into an embossing device, the embossing device comprising an upper mold and a lower mold; heating the embossing device; and applying a force to the polymer film by pressing or applying pressure using the upper and/or lower molds of the embossing device to thereby form the thin-walled well.

As previously stated, the polymer film is typically a pre-formed, extruded film. The film can be made from any suitable thermoplastic polymer. Exemplary thermoplastic polymers include without limitation acrylonitrile butadiene styrene (ABS), polycarbonate, polyesters, polyethylene, polyethylene terephthalate, polylactic acid, poly(methyl-methacrylate), polyolefins, polyphenylene oxide, polypropylene, polystyrene, polytetrafluoroethylene, polyvinyl chloride, and copolymers, mixtures, and blends thereof.

Film thickness may range from about 50 microns to about 1000 microns. For example, the film thickness may be about 30 microns, about 35 microns, about 40 microns, about 45 microns, about 50 microns, about 55 microns, about 60 microns, about 65 microns, about 70 microns, about 75 microns, about 80 microns, about 85 microns, about 90 microns, about 95 microns, about 100 microns, about 150 microns, about 200 microns, about 250 microns, about 300 microns, about 350 microns, about 400 microns, about 450 microns, about 500 microns, about 550 microns, about 600 microns, about 650 microns, about 700 microns, about 750 microns, about 800 microns, about 850 microns, about 900 microns, about 950 microns, or about 1000 microns. In one variation, the film thickness ranges from about 50 microns to about 100 microns. In another variation, the film thickness ranges from about 100 microns to about 200 microns. The polymer film can be provided as a first roll or reel of film capable of being loaded onto a feed mechanism. The feed mechanism can be any suitable mechanism but is typically a rotating or winding component that advances/feeds the film from the reel to other components of the manufacturing system.

After leaving the film reel, the polymer film may be heated to soften the film, typically to or above the glass transition temperature ($T_g$) of the polymer. The polymer film may be heated to about 80 to about 280 degrees Celsius. For example, a polystyrene film may be heated to about 95 degrees Celsius. Heating of the polymer film softens the film in preparation for embossing, and can be accomplished using a film heater, which may be an electric heater.

Figure 1C:
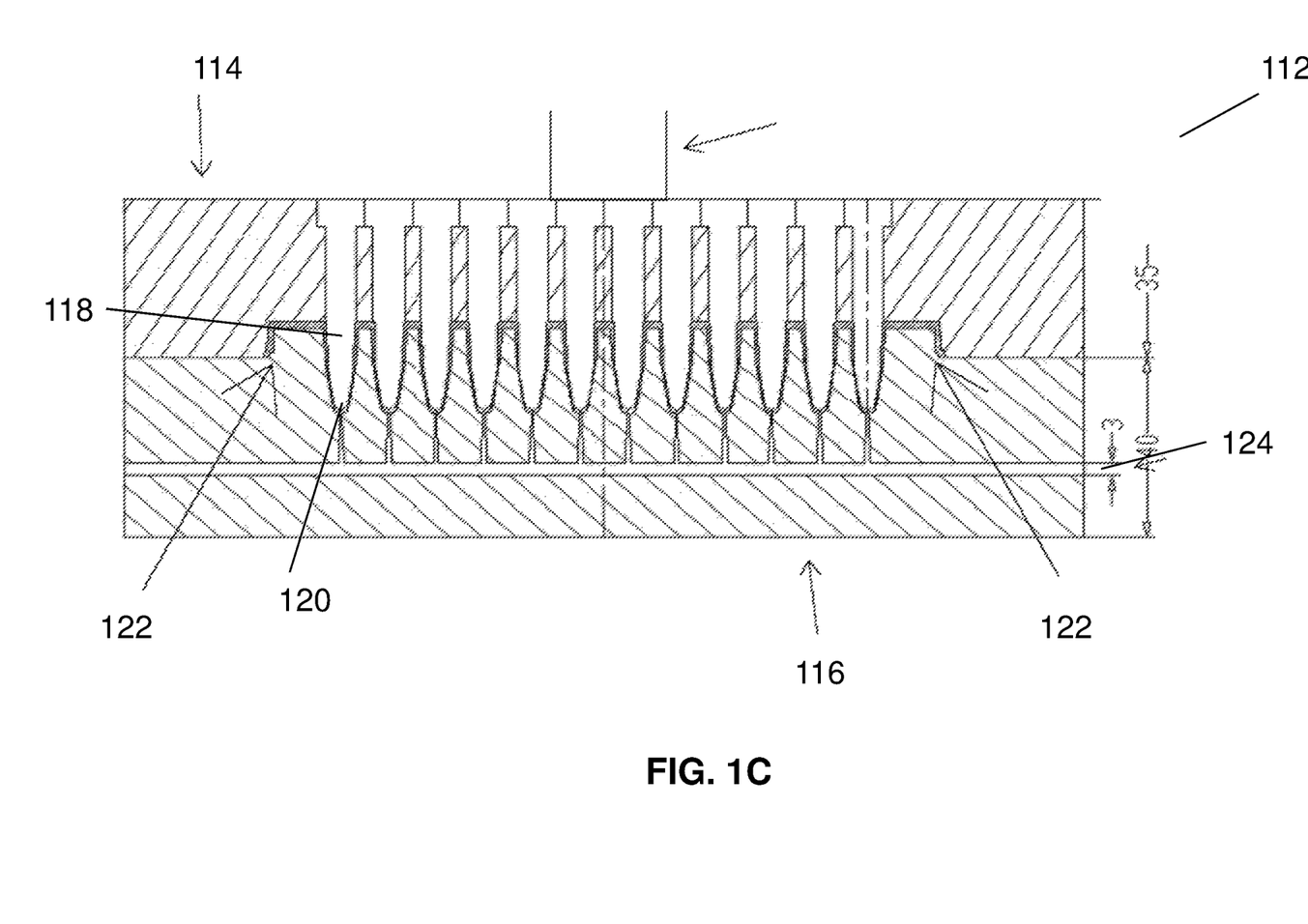
FIG. 1C depicts, a side, cross-sectional view of an exemplary embossing device.

The softened polymer film may then be advanced into an embossing device that comprises an upper mold and a lower mold. The upper mold is typically a male tool and may include a single plug or a plurality of plugs. The lower mold is typically a female tool, which may include a single recess or a plurality of recesses, for receiving the plugs of the male tool. The plugs and recesses can be variously shaped depending on the well shape desired, and in some instances the shape can be customized. For example, the wells may be shaped to be conical, square, rectangular, or v-shaped. Referring to FIG. 1C, embossing device (100) includes an upper mold (102) and a lower mold (104). The upper mold (102) comprises a plurality of conically shaped plugs (106) capable of being received in correspondingly shaped recesses (108) in lower mold (104). A softened polymer film (110) disposed between the molds (102, 104) is formed into a plurality of thin walled wells when the upper (102) and/or lower (104) molds are brought together to sandwich the softened polymer film (110) between the molds. In addition to mechanical pressure (force), and as described further below, vacuum pressure may be applied via vacuum channel (112) to help form the wells.

The upper and lower molds of the embossing device are heated as part of the thermoforming process. Heat can be generated using any suitable heat source, e.g., an electric heater or an ultrasonic heater or an air heater (such as the HOTWIND forced air heaters manufactured by Leister USA, Itsaca, Ill.). In some instances, it may be useful to heat the embossing device with an ultrasonic heat source. Here heat is generated by high frequency vibration of the upper and/or lower molds, and by the friction generated between the molds. In some variations, the lower mold is fixed and the upper mold is coupled to an ultrasound vibrator (e.g., element (114) in FIG. 1C). The frequency of vibration may range from about 15 KHz to 40 Khz. For example, the frequency of vibration may be about 15 KHz, about 20 KHz, about 25 KHz, about 30 KHz, about 35 KHz, or about 40 KHz. Ultrasonic heating generally provides a more precise temperature range. In general, the embossing device is heated to a temperature ranging from about 80 to about 180 degrees Celsius. The embossing device may be heated to a temperature (in Celsius) of about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, or about 180 degrees. Wall thickness and the shape/geometry of the wells may be less variable given the precise heating provided by ultrasound vibration.

Figure 2A:
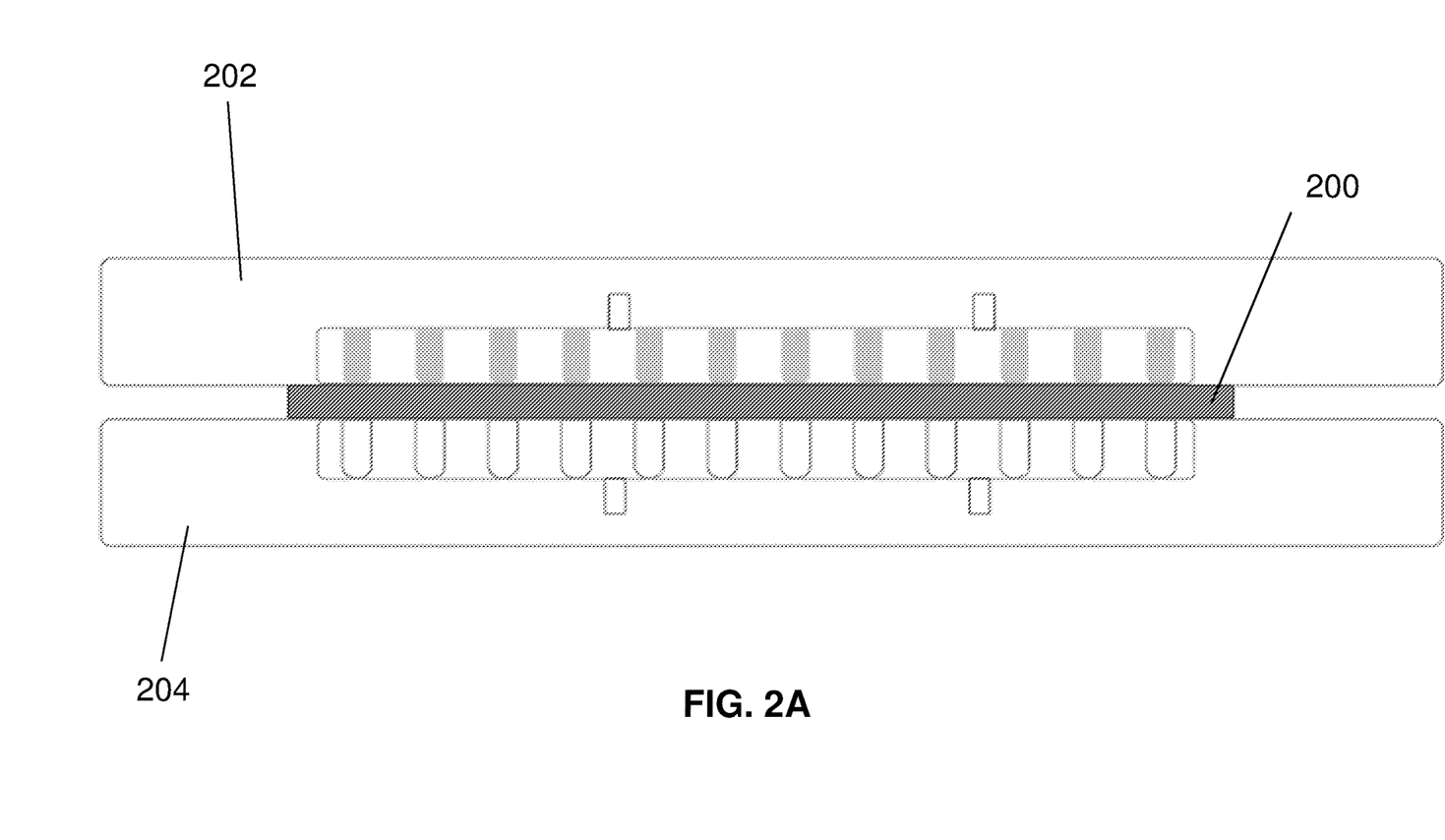
FIGS. 2A-2D illustrate an exemplary method for forming thin-walled wells.
Figure 2B:
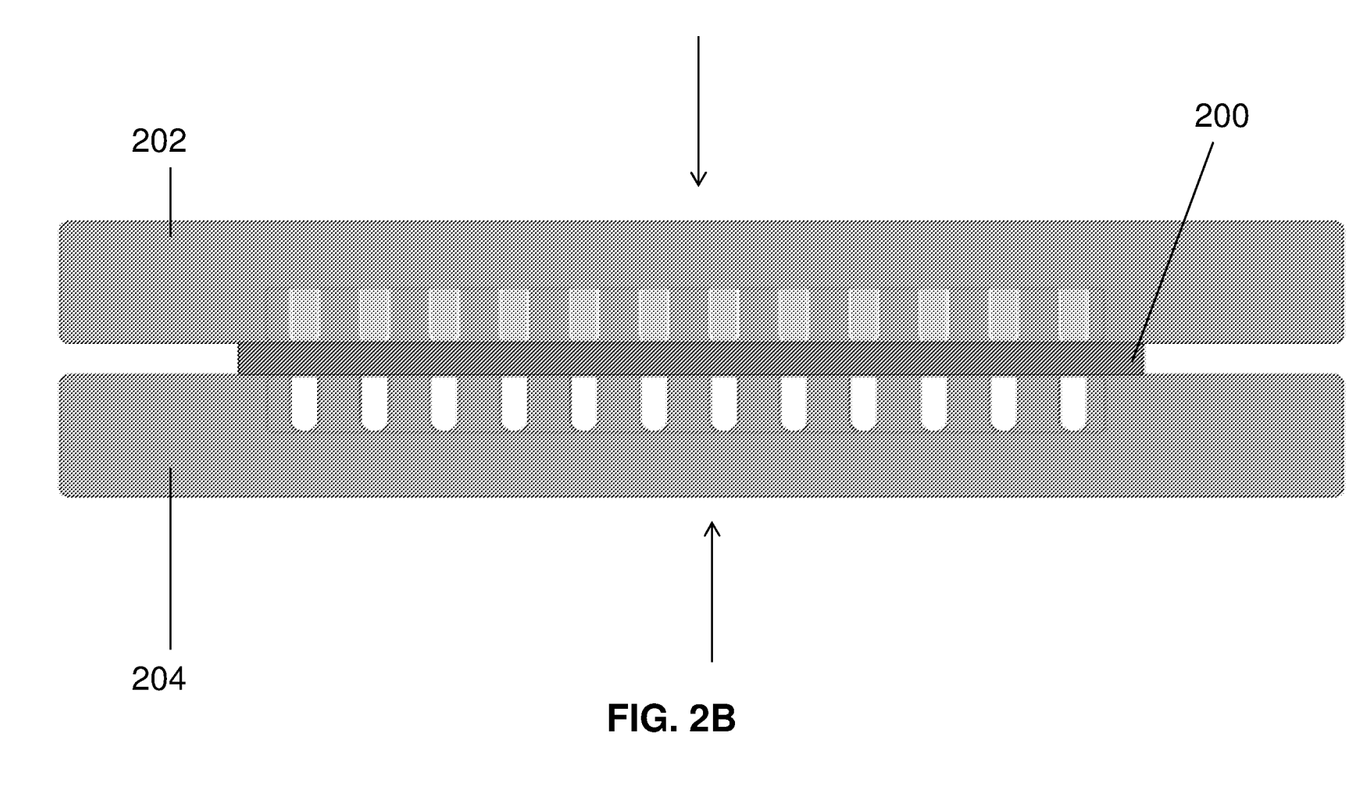
Figure 2C:
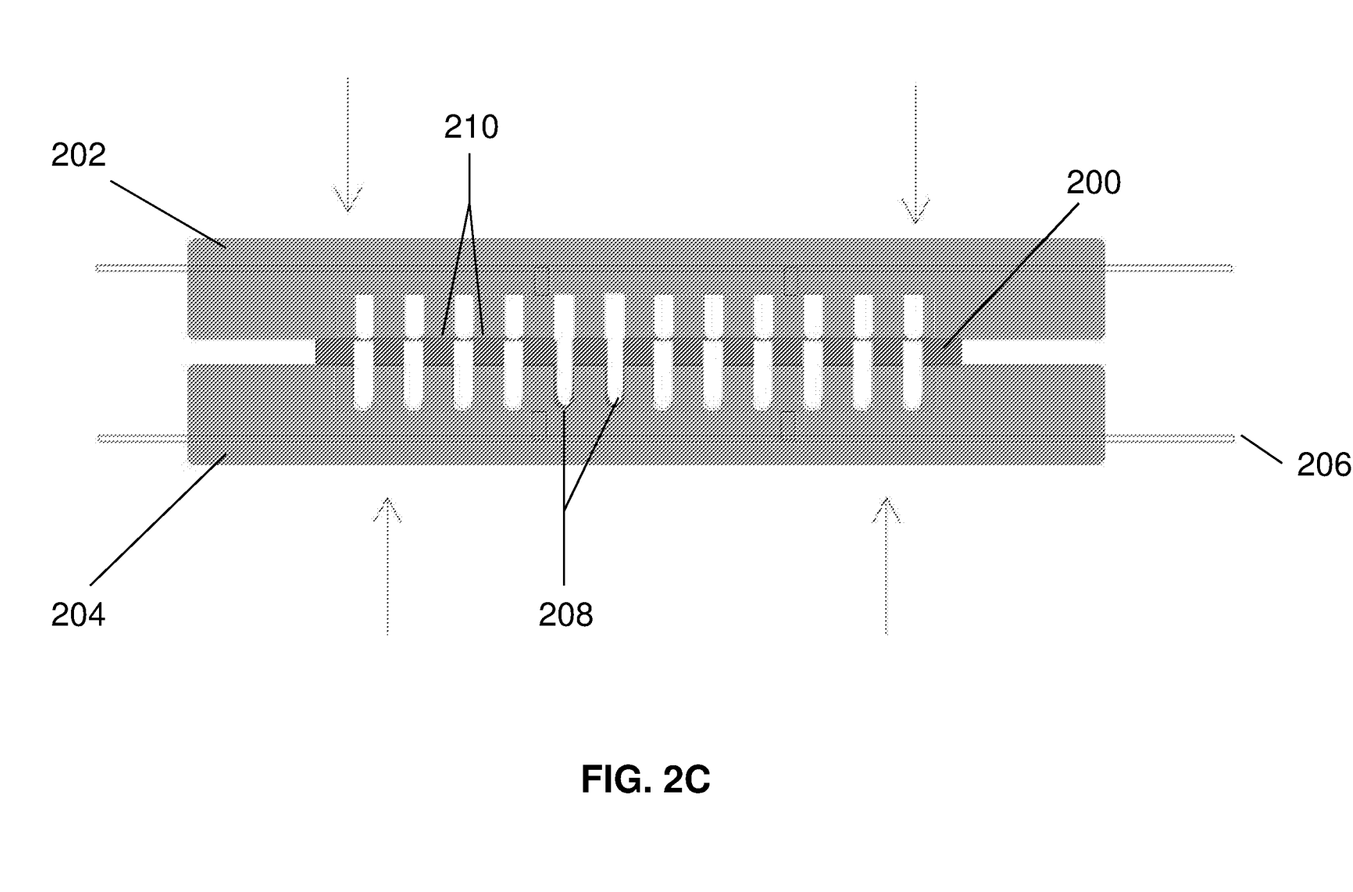

Force may be applied to the softened polymer film by pressing the lower mold against the upper mold or vice versa, or pressing the upper and lower molds together at the same time. The amount of force that may be applied ranges from about 3.0 to about 6.0 kg. Heat and pressure may be applied for about one second to about 10 seconds to form the thin-walled wells. As illustrated in FIGS. 2A-2D, an exemplary manufacturing method may as a first step provide for a polymer film (200) to be disposed between an upper mold (202) and a lower mold (204) (FIG. 2A). Heat (e.g., from ultrasound vibrations or other thermoforming heat sources) and force (in the direction of the arrows) may then be applied to softened polymer film (200), as shown in FIG. 2B. In some variations, and as shown in FIG. 2C, vacuum supplied from a vacuum channel (206) may be used to help draw or stretch out sections of the film to form the wells (208). For example, vacuum pressure may be applied in an amount ranging from about 0.3 to about 0.5 MPa. The unstretched sections (210) will typically be the flat portions of the microplate that connect the wells. In one variation of the manufacturing method, heat produced by ultrasound vibration of the mold is applied at the same time (i.e., simultaneously) as the application of force and vacuum pressure to the film. In other variations, the heat is applied prior to the application of force and vacuum pressure (i.e., in a sequential manner).

Figure 2D:
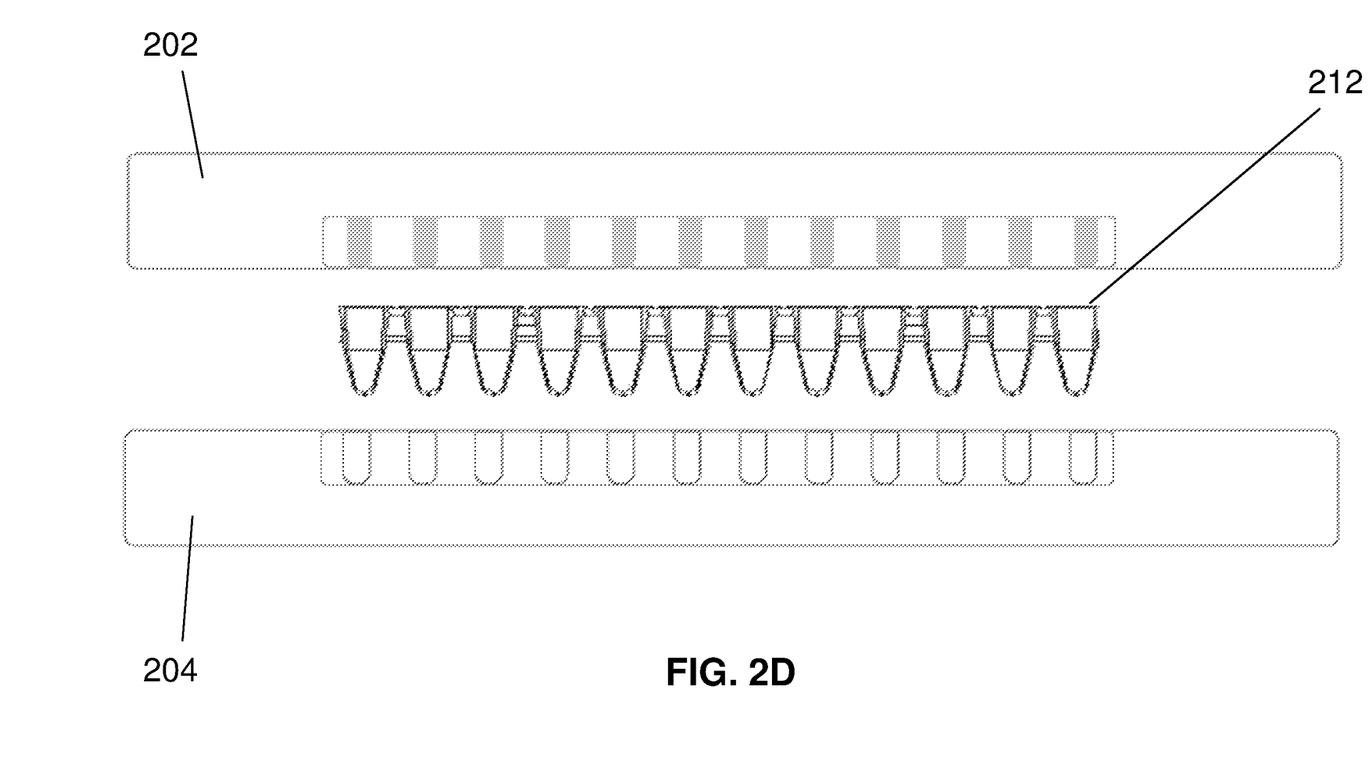

The upper and lower molds are then separated and the molded wells cooled for a duration of about two to about 12 seconds. Thereafter, the molded well portion of the film can be cut, trimmed, etc., as desired, to form a microplate having a plurality of wells, an array of wells, a strip of wells, or a single well. For example, in FIG. 2D, a microplate (212) cut from the polymer film is shown after upper mold (202) has been separated from lower mold (204). It is understood that the molded wells can be cut from the polymer film during the application of pressure. In one variation, the polymer film is first cut and then heat and pressure applied to the cut film to form the wells. The thin-walled wells that are formed may have a wall thickness ranging from about 30 microns to about 120 microns, as previously stated. The formed wells are advanced to an indexing station for further inspection. The remaining polymer film may then be taken up on a second reel for further processing to form frame portions for attaching to the well portions. Given the thinness of the starting polymer film, the well portion of the microplate can possess a flexibility such that handling is not easily accomplished. Thus, the frame portion can be formed to be more rigid than the well portion, and thereafter attached to the well portion by welding, e.g., ultrasound welding. Alternatively, the remaining polymer film may be fed into an inline granulator for recycling.

In some variations, the methods for manufacturing include controlling one or more parameters of the forming process using a user interface. Exemplary parameters that can be controlled include the duration of each manufacturing step, temperature, amount of pressure/force applied, speed of moving/advancing between various stations or components of the system, position, etc.

Systems

Described herein are systems for manufacturing microplates having ultra thin-walled wells. In general, the systems include a feed mechanism for advancing a polymer film; a mold heater; a film heater between the feed mechanism and the mold heater; and an embossing device comprising an upper mold and a lower mold coupled to the mold heater. The systems may be automated and configured for high volume manufacturing of microplates. A user interface may be included to control various system parameters, as described above.

Figure 3:
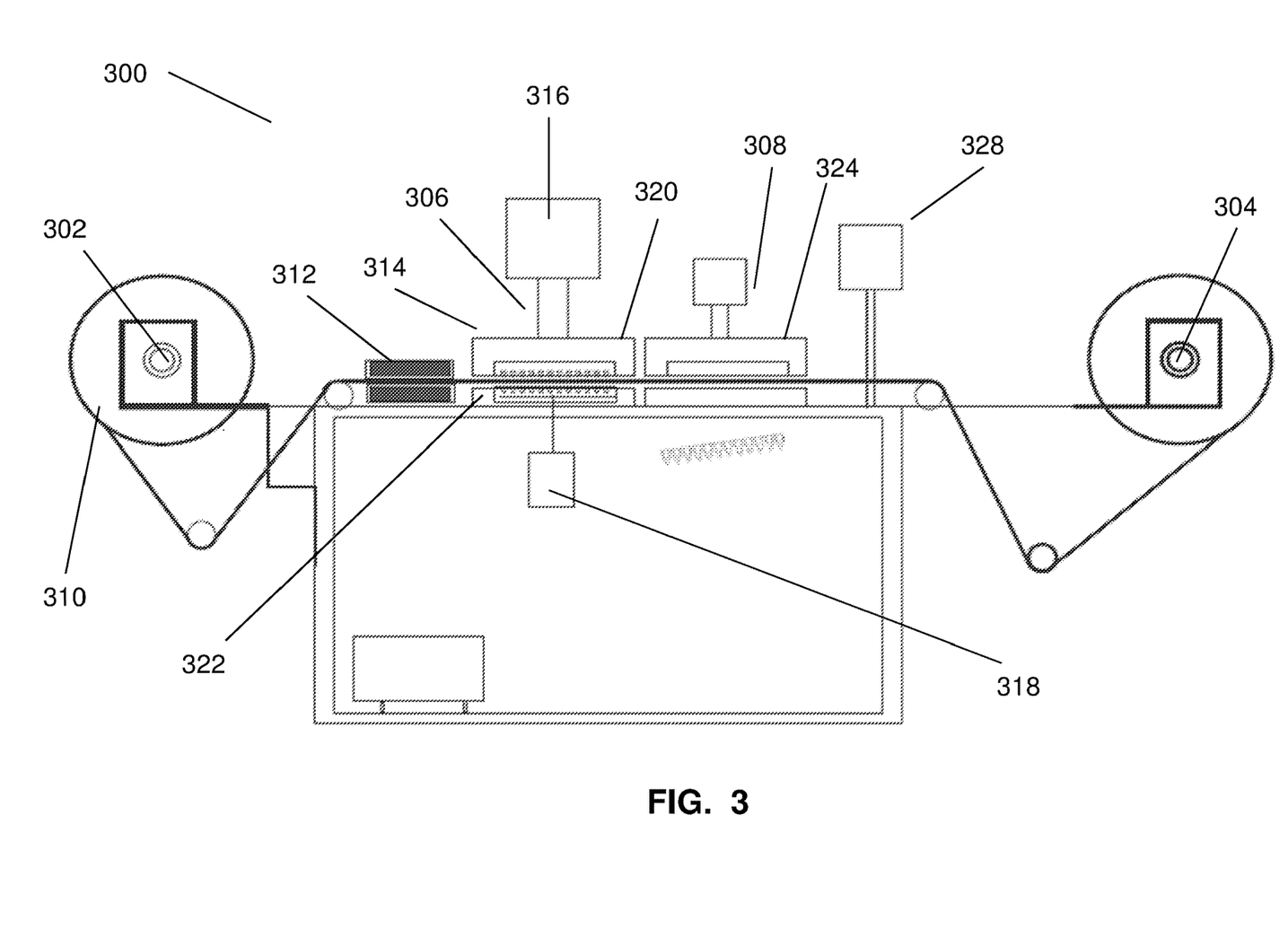
FIG. 3 depicts an exemplary system for manufacturing thin-walled wells.

Referring to FIG. 3, exemplary system (300) includes a first reel (302), a second reel (304), a thermoforming station (306), a cutting station (308), and a user interface (328). The first reel (302) holds a roll of polymer film (310) and feeds the film to downstream components of the system. After leaving the roll (310), the film is advanced through a film heater (312) to soften the polymer. Here the film heater (312) is an electric infrared heater, but other suitable heaters may be employed. Next, the softened film is fed to the thermoforming station (306) where the thin-walled wells are formed. Thermoforming station (306) comprises an embossing device (314), a mold heater (316) coupled to the embossing device (314), and optionally, a vacuum pump (318). The mold heater (316) may be an electric heater or an ultrasound unit that vibrates the embossing device (314). More specifically, the embossing device (314) comprises an upper mold (320) and a lower mold (322) between which the polymer film is disposed. The mold heater (316) is coupled to the upper mold (320) and if included, the vacuum source is coupled to the lower mold (322). The cutting station (308) includes a cutting die (324) capable of separating the molded wells received from the thermoforming station (306). The remaining polymer film may then be advanced and collected on second reel (304) for recycling or further processing into frames.

The invention claimed is:

1. A method for manufacturing a microplate comprising a plurality of wells, the method comprising:
   preheating, with a film heater, a polymer film having a first film thickness;
   advancing, via one or more reels, the preheated polymer film into an embossing device, the embossing device comprising an upper mold and a lower mold;
   heating at least one of the upper mold and the lower mold of the embossing device with an ultrasonic heat source to apply heat to the polymer film;
   applying a force to the polymer film, via the embossing device, by pressing the polymer film between the upper and lower molds of the embossing device to form the plurality of wells, wherein a first portion of the polymer film corresponds to the plurality of wells and a second portion of the polymer film corresponds to one or more flat portions disposed between the plurality of wells; and
   applying a vacuum pressure to the polymer film, via a vacuum channel, to stretch the first portion of the polymer film to form the plurality of wells,
   wherein the stretched first portion of the polymer film has a variable thickness and the second portion of the polymer film has a second thickness greater than the variable thickness,
   wherein the first film thickness ranges from about 50 microns to about 1000 microns.

2. The method of claim 1, wherein the polymer film is an extruded polymer film, and wherein the first film thickness is uniform.

3. The method of claim 1, wherein the plurality of wells have a wall thickness ranging between about 20 to about 120 microns.

4. The method of claim 3, wherein the plurality of wells have a wall thickness of about 50 microns.

5. The method of claim 1, further comprising heating, with a heat source, at least one of the upper or lower mold of the embossing device to a temperature ranging from about 80 to about 280 degrees Celsius.

6. The method of claim 1, further comprising heating, with an ultrasonic heat source, at least one of the upper or lower mold of the embossing device.

7. The method of claim 6, wherein the ultrasonic heat source produces heat by vibrating at a frequency ranging from about 15 KHz to 40 KHz.

8. The method of claim 1, wherein the force applied to the polymer film is in a range from about 3.0 to about 6.0 kg.

9. The method of claim 1, further comprising applying a vacuum force to the polymer film with a pump coupled to the embossing device.

10. The method of claim 9, wherein the vacuum force applied to the polymer film ranges from about 0.3-0.5 MPa.

11. The method of claim 1, wherein the polymer film comprises a thermoplastic polymer.

12. The method of claim 1, wherein the microplate comprises an array of the plurality of wells.

13. The method of claim 1, wherein a volume of each of the plurality of wells has a coefficient of variation value ranging from about 3% to about 5%.

14. A method for manufacturing a microplate comprising a plurality of wells, the method comprising:

preheating, with a film heater, a polymer film;

advancing, via one or more reels, the preheated polymer film into an embossing device, the embossing device comprising an upper mold and a lower mold;

heating at least one of the upper mold and the lower mold of the embossing device with an ultrasonic heat source to apply heat to the polymer film;

applying a force to the polymer film, via the embossing device, by pressing the polymer film between the upper and lower molds of the embossing device to form the plurality of wells, wherein a first portion of the polymer film corresponds to the plurality of wells and a second portion of the polymer film corresponds to one or more flat portions disposed between the plurality of wells; and applying a vacuum pressure to the polymer film, via a vacuum channel, to stretch the first portion of the polymer film to form the plurality of wells, wherein the stretched first portion of the polymer film has a variable thickness and the second portion of the polymer film has a second thickness greater than the variable thickness.

* * * * *